I. S. BUNNELL.
Potato-Digger.
No. 18,954. Patented Dec. 29, 1857.
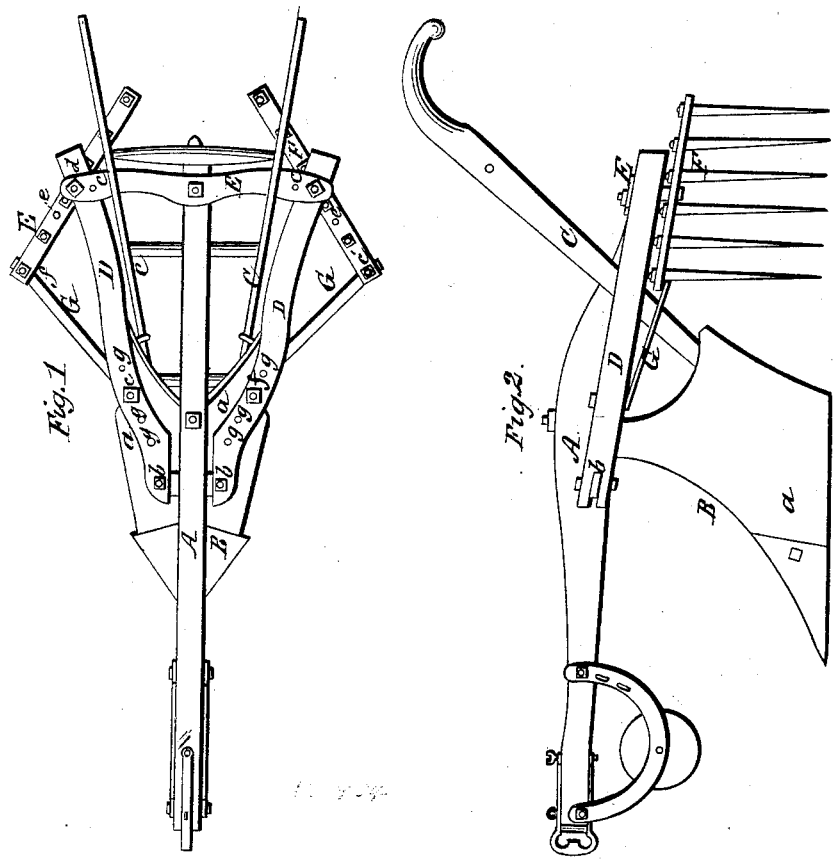

UNITED STATES PATENT OFFICE.

ISAAC S. BUNNELL, OF MONTROSE, PENNSYLVANIA.

IMPROVEMENT IN POTATO-DIGGERS.

Specification forming part of Letters Patent No. 18,954, dated December 29, 1857.

*To all whom it may concern:*

Be it known that I, ISAAC S. BUNNELL, of Montrose, in the county of Susquehanna and State of Pennsylvania, have invented a new and useful Improvement in Potato-Diggers; and I do hereby declare that the following is a full, clear, and exact description of the same, reference being had to the accompanying drawings, forming part of this specification, in which—

Figure 1 is a plan or top view of my improved potato-digger. Fig. 2 is a side view of the same.

Similar letters of reference in each of the several figures indicate corresponding parts.

The nature of my invention consists in the arrangement, relatively to each other and for united operation, of the oblique-hinged wings, diagonal pivoted rakes, pivoted adjusting-rod, and double mold-board plowshare, whereby the potatoes can be thrown up on either side of the hill, separated from dirt, the vines cleared away, so as to leave the potatoes on the surface of the soil and in a regular row, and the soil reduced to a suitable condition for a succeeding crop.

To enable others skilled in the art to make and use my invention, I will proceed to describe its construction and operation.

A represents the beam of an ordinary plow; B, a plowshare with a beveled mold-board, $a\,a$, on each side of the vertical axis of the standard; C C, the handles of the plow; D D, the wings, hinged at $b\,b$ to the standard. E is a transverse rod for connecting together the rear ends of the wings. This rod has two or more adjusting-holes, $c\,c$, so that the wings may be brought nearer together or moved farther apart, as occasion requires.

F F are the rakes. They are arranged diagonally across the wings, on the under side of the same, being fastened by means of vertical pivots $d\,d$, which pass through the rake-heads at points near the center of the width of the same. These rakes, or rather their heads, have two or more adjusting-holes, $e\,e$, so that they may be set to take in more or less space behind the plow or between the wings, and thus, while the operation of separating and collecting the potatoes in a row and clearing away the vines is performed perfectly, more completely filling in the furrow formed by the plowshare and reducing the land to a suitable condition for a succeeding crop.

G G are two connecting-rods for adjusting and holding the rakes at any angle desired. These rods are pivoted to the outer ends of the rakes and to the front ends of the wings, as shown at $f\,f'$. $g\,g\,g$ are a series of adjusting-holes in the wings. They serve for receiving the pivots $f\,f$ of the rods G G whenever the rakes require to be set more or less oblique to lines at right angles to the wings, which will be the case when the implement is used for hilling or plowing between rows of corn which are near together and overgrown with weeds. When the implement is thus used the rakes will answer as well, if not better, for clearing away weeds than cultivator-shares.

What I claim as my invention, and desire to secure by Letters Patent, is—

The arrangement, relatively to each other and for united operation, of the oblique-hinged wings D D, diagonal pivoted adjustable rakes F F, pivoted adjusting-rods G' G', and double mold-board plowshare B $a\,a$, substantially as and for the purposes set forth.

I. S. BUNNELL.

Witnesses:
A. H. SMITH,
I. C. THEYER.